United States Patent [19]

Toyoda et al.

[11] Patent Number: 4,963,613

[45] Date of Patent: Oct. 16, 1990

[54] ADHESIVE COMPOSITION

[75] Inventors: Yasushi Toyoda; Saburo Mishiba, both of Niihama, Japan

[73] Assignee: Sumitomo Naugatuck Co., Ltd., Osaka, Japan

[21] Appl. No.: 376,548

[22] Filed: Jul. 7, 1989

[30] Foreign Application Priority Data

Jul. 7, 1988 [JP] Japan .................................. 63-169288
Oct. 13, 1988 [JP] Japan .................................. 63-258069
Mar. 20, 1989 [JP] Japan .................................... 1-68269

[51] Int. Cl.$^5$ .............................................. C08K 61/10
[52] U.S. Cl. ...................................... 524/594; 524/597; 525/64; 525/75; 525/76; 525/78; 525/86; 525/87; 525/133; 525/134; 525/238; 525/244
[58] Field of Search ................. 525/64, 75, 76, 78, 525/86, 87, 133, 134, 238, 244; 524/594, 597

[56] References Cited

U.S. PATENT DOCUMENTS

| | | | |
|---|---|---|---|
| 4,211,824 | 7/1980 | Yoshida | 428/462 |
| 4,569,963 | 2/1986 | Hisaki et al. | 524/458 |
| 4,657,285 | 4/1987 | Akiyama et al. | 285/256 |
| 4,762,589 | 8/1988 | Akiyama et al. | 156/307.3 |

OTHER PUBLICATIONS

Chemical Patents Index, Basic Abstracts, Derwent Publications, Abstract No. 86-07810/12, 5/86.

*Primary Examiner*—John Kight, III
*Assistant Examiner*—S. A. Acquah

[57] ABSTRACT

An adhesive composition comprising:
a polymer latex containing a copolymer which comprises
  (a) 40 to 80% by weight of a conjugated diene monomer and
  (b) 0.5 to 30% by weight of a cyanated vinyl monomer,
  (c) 5 to 35% by weight of vinylpyridine and
  (d) not more than 53% by weight of an aromatic vinyl monomer; and
a resorcin-formalin resin, which composition can adhere various fibers to rubbers.

8 Claims, No Drawings

ADHESIVE COMPOSITION

BACKGROUND OF THE INVENTION

1. Field of the Invention

The present invention relates to an adhesive composition for adhering a rubber and fibers. More particularly, the present invention relates to an adhesive composition for adhering the rubber and reinforcing fibers contained in a rubbery product such as a tire, a belt and a hose.

2. Description of the Related Art

Polyester fiber is widely used as a rubber-rein-forcing fiber in various applications such as carcass cords for radial tires, since it suffers from less elongation and has better dimensional stability than nylon fibers. However, since the polyester fiber has poor heat resistance, its adhesion strength between said fiber and the rubber greatly decreases after vulcanization at high temperature or thermal history at high temperature (heat resistant adhesion strength), and further its adhesion strength after vulcanization between the fiber and the rubber (initial adhesion strength) is poor. Then, the improvement of such adhesion strength is highly desired.

Since nylon or rayon fiber for reinforcing rubber is more active in adhesion with the rubbers than polyester fiber, the former fiber can be adhered to the rubber with an adhesive composition (RFL) comprising a butadiene-styrene-vinylpyridine copolymer latex or a mixture of said latex and a butadiene-styrene copolymer latex, and a resorcin-formalin resin (RF resin) to provide good initial adhesion strength and heat resistant adhesion strength.

In the RFL for the polyester fiber, the butadiene-styrene-vinylpyridine copolymer latex as such or the mixture of said latex and the butadiene-styrene copolymer latex is also used. Since the RFL for the nylon or rayon fiber does not give practical adhesion strength with the polyester fiber, the polyester fiber is pretreated with epoxy resins or isocyanate compounds and then treated with the RFL, or treated with a mixture of the RFL and an adhesive such as VULCABOND (manufactured by ICI Vulnax) wherein the main component is 2,6-bis-(2,4-dihydrophenylmethyl)-4-chlorophenol.

The latex to be contained in the RFL has been also improved. For example, Japanese Patent Kokai Publication Nos. 26629/1986 and 26630/1986 propose the use of a latex of vinylpyridine base copolymer modified with a carboxylic acid or its ester. However, in case of the polyester fiber, the cord strength of the fiber after dipping in said RFL is greatly decreased, and the adhesive composition comprising such latex has poor heat resistant adhesion strength so that the adhesive composition is not satisfactorily used in applications which require good heat resistance.

SUMMARY OF THE INVENTION

An object of the present invention is to provide an adhesive composition which imparts good adhesion strength to not only the polyester fiber but also to other fibers such as the nylon fiber, the rayon fiber, the aramid fiber, etc.

Accordingly, the present invention provides an adhesive composition comprising:
a polymer latex containing a copolymer which comprises (a) 40 to 80% by weight of a conjugated diene monomer,
(b) 0.5 to 30% by weight of a cyanated vinyl monomer,
(c) 5 to 35% by weight of vinylpyridine,
(d) not more than 53% by weight of an aromatic vinyl monomer and optionally
(e) 0.5 to 10% by weight of an unsaturated carboxylic acid monomer; and
a resorcin-formalin resin.

DETAILED DESCRIPTION OF THE INVENTION

Now, the components of the adhesive composition of the present invention are explained.

Examples of the conjugated diene monomer to be used in the copolymer latex are 1,3-butadiene, 2-methyl-1,3-butadiene, 2,3-dimethyl-1,3-butadiene and the like. They may be used independently or as a mixture thereof.

When the content of the conjugated diene monomer is less than 40% by weight, the initial adhesion strength is not improved. When said content is larger than 80% by weight, the heat resistant adhesion strength is not improved. Preferably, the content of the conjugated diene monomer is from 45 to 75% by weight.

Examples of the cyanated vinyl monomer are acrylonitrile, methacrylonitrile, fumaronitrile, maleonitrile and the like. They may be used independently or as a mixture thereof. When the content of the cyanated vinyl monomer is less than 0.5% by weight, the heat resistant adhesion strength is not improved. When said content is larger than 30% by weight, the initial adhesion strength is not improved. Preferably, the content of the cyanated vinyl monomer is from 1.5 to 20% by weight.

Examples of the vinylpyridine are 2-vinylpyridine, 3-vinylpyridine, 4-vinylpyridine, 2-methyl-5-vinylpyridne and the like. They may be used independently or as a mixture. Among them, 2-vinylpyridine is preferred. When the content of the vinylpyridine is less than 5% by weight, neither the initial adhesion strength nor the heat resistant adhesion strength is improved. When said content is larger than 35% by weight, the initial strength is not improved. Preferably, the content of the vinylpyridine is from 10 to 30% by weight.

Examples of the aromatic vinyl monomer are styrene, α-methylstyrene, monochlorostyrene and the like. They may be used independently or as a mixture thereof. Preferably, the content of the aromatic vinyl monomer does not exceed 40% by weight.

The copolymer latex may further comprise the unsaturated carboxylic acid monomer in the content of 0.5 to 10% by weight, preferably 1 to 7% by weight. Examples of the unsaturated carboxylic acid are fumaric acid, acrylic acid, itaconic acid, methacrylic acid and the like. They may be used independently or as a mixture thereof.

When the unsaturated carboxylic acid is used, the content of the aromatic vinyl monomer does not exceed 52.5% by weight, preferably 41% by weight.

A weight average particle size in the copolymer latex is not critical in the present invention. In view of good heat resistant adhesion strength, the weight average particle size is preferably from 70 to 140 nm.

The copolymer latex may be prepared by any of per se conventional methods, for example, a batch wise method, a partial addition method, a continuous addition method, a two-stage polymerization method and a power feed method.

The adhesive composition of the present invention can be used for adhering any fiber to the rubber. Examples of the fiber are the polyester fiber, the nylon fiber, the rayon fiber, the aramid fiber and the like.

The fiber to be adhered may be pretreated with the epoxy resin or the isocyanate compound to improve the adhesivity.

The fiber may be in the form of a cord, a cable, a woven fabric, a canvas sheet, a filament chip and the like.

Examples of the rubber to which the fiber is adhered are natural rubber, SBR, NBR, chloroprene rubber, polybutadiene rubber, polyisoprene rubber and modified rubbers thereof.

The adhesive composition of the present invention prevents the deterioration of the cord strength of the polyester fiber after dipping in the RFL and improves the heat resistant adhesion strength. Further, the adhesive composition of the present invention provides good adhesivity between the aramid fiber and the chloroprene rubber.

As the resorcin-formalin resin to be contained in the adhesive composition of the present invention, any of the conventionally used ones may be used.

The amount of the resorcin-formalin resin in terms of the solid content is 8 to 30 parts by weight per 100 parts by weight of the copolymer latex in terms of the solid content.

The adhesive composition of the present invention may optionally contain isocyanate, blocked isocyanate, ethyleneurea, polyepoxide, modified polyvinyl chloride and the like.

PREFERRED EMBODIMENTS OF THE INVENTION

The present invention will be illustrated by following Examples, which do not limit the present invention. In Examples, "parts" and "%" are by weight unless otherwise indicated.

EXAMPLE 1

PREPARATION OF COPOLYMER LATEXES A–J

To an autoclave equipped with a stirrer, water (130 parts), potassium rhodate (4 parts), sodium naphthalenesulfonate/formalin condensate (1 part) and sodium hydroxide (0.5 part) were charged and dissolved. To the resulting solution, a monomer mixture having a composition shown in Table 1 (100 parts) and tert.-dodecylmercaptan (0.5 part) were added and emulsified.

Then, potassium persulfate (0.5 part) was added to initiate polymerization, which was continued by keeping the temperature of the reaction system at 50° C. When a polymerization conversion reached 92%, hydroquinone (0.1 part) was added to terminate polymerization. The unreacted monomers were distilled off under reduced pressure from the reaction mixture to obtain each of the copolymer latexes A through J.

PREPARATION OF COPOLYMER LATEXES K AND L

To an autoclave equipped with a stirrer, water (150 parts), polyoxyethylenelauryl ether (5 parts), sodium ethylenediaminetetraacetate (0.05 part), tert.-dodecylmercaptan (0.5 part), potassium persulfate (0.3 part) and a monomer mixture having a composition shown in Table 1 (100 parts) were added and polymerized at 50° C.

When a polymerization conversion reached 50%, tert.-dodecylmercaptan (0.5 part) was added and when the polymerization conversion reached 95%, hydroquinone (0.05 part) was added to terminate polymerization. The unreacted monomers were distilled off under reduced pressure from the reaction mixture to obtain each of the copolymer latexes K and L.

PREPARATION OF RFL SOLUTION

To water (333.5 parts), sodium hydroxide (1.3 parts), resorcin (16.6 parts) and 37% formalin (14.6 parts) were added and aged at 25° C. for 2 hours to obtain the RF resin.

To each of the copolymer latexes A through L (100 parts), the obtained RF resin (23.3 parts) was added and aged at 25° C. for 20 hours. Then, 2,6-bis(2', 4'-dihydroxyphenylmethylene)-4-chlorophenol (VULCABOND manufactured by ICI Vulnax) (35 parts) was added, and water was added to adjust the solid content to 15% to obtain each of RFL solutions 1 through 12 shown in Table 3.

TIRE CORD DIP TREATMENT AND MEASUREMENT OF ADHESIVE STRENGTH AND CORD STRENGTH

By means of a laboratory single cord dipping machine, a polyester tire cord (1500D/2) was dipped in each of the RFL solutions 1 through 12. The treated tire cord was sandwiched between a pair of sheets of a rubbery composition having a formulation shown in Table 2 and press cured at 140° C. for 45 minutes or at 170° C. for 90° C. According to the procedures of ASTM D 2138-67 (H Pull Test), the adhesive strength was measured to evaluate decrease of the adhesive strength due to thermal history at high temperature. Cord strength of each dip treated tire cord was measured according to JIS L 1017. The results are shown in Table 3.

TABLE 1

| Copolymer latex[*1] | A | B | C | D | E | F | G | H | I | J | K | L | M | N |
|---|---|---|---|---|---|---|---|---|---|---|---|---|---|---|
| Butadiene | 45 | 55 | 75 | 60 | 35 | 80 | 70 | 50 | 60 | 45 | 65 | 70 | 50 | 50 |
| Acrylonitrile | 5 | 4 | 15 | 15 | 5 | 7 | | 25 | 5 | 7 | | | 10 | 5 |
| Methacrylonitrile | | 4 | | 5 | | | 10 | | | | | | | |
| 2-Vinylpyridine | 11 | 20 | 10 | 15 | 20 | 8 | 15 | 10 | 3 | 30 | 15 | 15 | 15 | 15 |
| 4-Vinylpyridine | | 8 | | | | | | 3 | | 10 | | | | |
| Styrene | 38 | 4 | | 5 | 30 | 5 | 15 | | 27 | 8 | 8 | 5 | 25 | 30 |
| Alpha-methylstyrene | | 5 | | | 10 | | | 2 | 5 | | | | | |
| Itaconic acid | | | | | | | | | | | 7 | | | |
| Acrylic acid | | | | | | | | | | | | 5 | | |

TABLE 1-continued

| Copolymer latex*1 | A | B | C | D | E | F | G | H | I | J | K | L | M | N |
|---|---|---|---|---|---|---|---|---|---|---|---|---|---|---|
| Methyl methacrylate | | | | | | | | | | | | | 10 | |

Note:
*1Copolymer latexes A through D, M and N are in the scope of the present invention, and copolymer latexes E through L are comparative ones.

TABLE 2

| (Rubber formulation) | |
|---|---|
| Component | Parts |
| Natural rubber | 40 |
| SBR #1502 | 60 |
| SRF carbon | 20 |
| REF carbon | 20 |
| Paintal | 5 |
| Styrenated phenol | 2 |
| Stearic acid | 2.5 |
| Zinc white | 5 |
| Vulcanizing accelerator CZ (N-cyclohexyl-2-benzothiazylsulfenamide) | 1.2 |
| Sulfur | 2.4 |

TABLE 3

| RFL No. | Copolymer Latex | Cord strength (Kg) | Adhesive strength (Kg/9 mm) Curing Conditions | |
|---|---|---|---|---|
| | | | 140°C. × 45 min. | 170° C. × 90 min. |
| Examples | | | | |
| 1 | A | 23.2 | 17.3 | 14.3 |
| 2 | B | 23.0 | 17.8 | 14.0 |
| 3 | C | 22.7 | 18.1 | 13.3 |
| 4 | D | 22.9 | 17.0 | 14.1 |
| Comparative Examples | | | | |
| 5 | E | 23.0 | 12.3 | 11.1 |
| 6 | F | 21.5 | 16.9 | 8.2 |
| 7 | G | 21.8 | 16.2 | 8.4 |
| 8 | H | 22.1 | 13.2 | 9.0 |
| 9 | I | 21.7 | 14.3 | 8.2 |
| 10 | J | 22.6 | 12.5 | 10.9 |
| 11 | K | 20.9 | 15.8 | 11.8 |
| 12 | L | 21.9 | 16.3 | 8.8 |

EXAMPLE 2

PREPARATION OF COPOLYMER LATEXES M AND N

In the same manner as in Example 1 but using the monomer mixture of Table 1, the copolymer latexes M and N were prepared.

PREPARATION OF RFL SOLUTIONS

To a mixture of pure water (382 parts) and 25% ammonia (10.4 parts), resorcin-formalin resin (solid content of 75%, "Sumicanol 700" manufactured by Sumitomo Chemical Company, Ltd.) (37 parts) and then the copolymer latex (solid content of 41%) (410 parts) were added and stirred for 3 minutes. To the mixture, pure water (142 parts) and a 37% aqueous solution of formalin (18.6 parts) were added and stirred for 3 minutes, followed by aging at room temperature for 12 hours to prepare the RFL solutions 13 through 15 shown in Table 5.

Tire Cord Dip Treatment and Measurement of Adhesive Strength

With each of the RFL solutions 13 through 15, Towaron 1001 (aramid fiber cord manufactured by Akzo. Finished to impart adhesivity) (1680 D×2) was dip coated and dried at 130° C. for 60 seconds followed by baking at 235° C. for 90 seconds. The treated fiber was wound on a parallel winder to form a cord fabric, and the cord fabric was sandwiched between a pair of sheets of a rubbery composition having a formulation of Table 4 and press cured under the conditions shown in Table 5.

Then, according to JIS K 6301, the cord fabric sample having a width of 2 cm was prepared and 180 degree peel strength was measured at a pulling rate of 50 mm/min. The results are shown in Table 5.

TABLE 4

| (Rubber formulations) | | | |
|---|---|---|---|
| | Hydrogenated NBR (H-NBR) | Sulfur-modified chloroprene rubber (S-C) | Non-S-modified chloroprene rubber (CR) |
| Zetpol 2020 | 100 part | | |
| Neoprene GW | | 100 parts | |
| Neoprene W | | | 100 parts |
| ZnO | 5 parts | 5 parts | 5 parts |
| Stearic acid | 1 part | 1 part | 1 part |
| SRF carbon | 40 parts | 60 parts | 60 parts |
| Aromatic processing oil | | 12 parts | 12 parts |
| MgO | | 4 parts | 4 parts |
| Amine-ketone condensate | | 2 parts | 2 parts |
| Sulfur | 1.5 parts | | 1 part |
| Tetrathiuram disulfide | 1.5 parts | 0.5 part | |
| Mercaptobenzothiazole | 0.5 part | | |
| Tetrathiuram monosulfide | | | 1 part |
| 2-Mercaptan imidazoline | | 0.5 part | |
| Diphenylguanidine | | | 1 part |

TABLE 5

| Rubber | RFL No. | Copolymer latex | Adhesion strength (kg/2 cm) |
|---|---|---|---|
| Examples | | | |
| H-NBR | 13 | M | 18*(1) |
| S-CR | 13 | M | >25*(2) |
| CR | 14 | N | >25*(3) |
| Comp. Examples | | | |
| H-NBR | 15 | O | 4.0*(1) |
| S-CR | 15 | O | 4.8*(2) |
| CR | 15 | O | 14.2*(3) |

Note:
*(1)Cured at 160° C. for 15 minutes.
*(2)Cured at 150° C. for 13 minutes.
*(3)Cured at 150° C. for 30 minutes.

EXAMPLE 3

Preparation of Copolymer Latexes AA through DD and FF through LL

In the same manner as in the preparation of the copolymer latexes K through L in Example 1 but using a monomer mixture having a composition of Table 6, each of the copolymer latexes AA through DD and FF through LL was prepared.

Preparation of Copolymer Latexes EE and MM

In the same manner as in the preparation of the copolymer latexes A through J in Example 1 but using a monomer mixture having a composition of Table 6, each of the copolymer latexes EE and MM was prepared.

Preparation of RFL solutions

In the same manner as in Example 1 but using the copolymer latexes AA through MM, the RFL solutions 16 through 28 shown in Table 7 were prepared.

Tire Cord Dip Treatment and Measurement of Adhesive Strength

In the same manner as in Example 1 but using each of the RFL solutions 13 through 25, the tire cord was dip treated and decrease of the adhesive strength due to thermal history at high temperature was evaluated.

Cord strength of each dip treated tire cord was measured according to JIS L 1017.

The results are shown in Table 7.

TABLE 6

| Copolymer latex*[1] | AA | BB | CC | DD | EE | FF | GG | HH | II | JJ | KK | LL | MM |
|---|---|---|---|---|---|---|---|---|---|---|---|---|---|
| Butadiene | 45 | 55 | 75 | 60 | 70 | 55 | 65 | 50 | 60 | 45 | 35 | 83 | 70 |
| Acrylonitrile | 6 | 2 | 8 | 15 | 5 | 4 |  | 25 | 5 | 7 | 5 |  | 3 |
| Methacrylonitrile |  | 6 |  |  |  | 4 | 10 |  |  |  |  |  |  |
| 2-Vinylpyridine | 11.5 | 20 | 15 | 17 | 11 | 10 | 15 | 10 | 3 | 30 | 20 | 7 | 15 |
| 4-Vinylpyridine |  | 6 |  |  |  | 8 |  |  | 10 |  |  |  |  |
| Styrene | 36 | 6 |  | 5 | 14 | 5 | 14 | 3 | 27 | 6 | 35 |  | 15 |
| Alpha-methylstyrene |  |  |  |  |  |  |  |  |  |  |  | 5 |  |
| Itaconic acid | 0.5 |  |  | 1 |  |  | 1 | 2 |  |  |  |  |  |
| Acrylic acid | 1.0 |  | 1 | 2 |  | 2 | 2 | 1 | 3 | 1 | 2 | 1 |  |
| Fumaric acid |  | 2 | 1 |  |  | 2 | 4 |  |  |  | 3 | 1 |  |
| Methacrylic acid |  | 3 |  |  |  | 10 |  |  |  | 1 |  |  |  |

Note:
*[1] Copolymer latexes AA through DD are in the cope of the present invention, and copolymer latexes EE through MM are comparative ones.

TABLE 7

| RFL No. | Copolymer Latex | Cord strength (kg) | Adhesive strength (kg/9 mm) Curing conditions | |
|---|---|---|---|---|
| | | | 140° C. × 45 min. | 170° C. × 100 min. |
| Examples | | | | |
| 13 | AA | 23.5 | 17.6 | 15.5 |
| 14 | BB | 23.0 | 18.0 | 14.4 |
| 15 | CC | 22.6 | 18.2 | 14.0 |
| 16 | DD | 22.9 | 17.2 | 14.4 |
| Comparative Examples | | | | |
| 17 | EE | 22.9 | 17.3 | 12.5 |
| 18 | FF | 21.5 | 14.2 | 11.8 |
| 19 | GG | 21.3 | 16.0 | 10.1 |
| 20 | HH | 22.5 | 11.0 | 10.2 |
| 21 | II | 22.0 | 15.0 | 9.0 |
| 22 | JJ | 22.8 | 13.4 | 11.5 |
| 23 | KK | 22.8 | 13.2 | 11.0 |
| 24 | LL | 20.9 | 18.0 | 8.8 |
| 25 | MM | 21.5 | 16.5 | 8.4 |

What is claimed is:

1. An adhesive composition comprising:
   a polymer latex containing a copolymer which comprises
   (a) 40 to 80% by weight of a conjugated diene monomer and
   (b) 0.5 to 30% by weight of a cyanated vinyl monomer,
   (c) 5 to 35% by weight of vinylpyridine and
   (d) not more than 53% by weight of an aromatic vinyl monomer; and
   a resorcin-formalin resin.

2. The adhesive composition according to claim 1, wherein the copolymer further comprises
   (e) 0.5 to 10% by weight of an unsaturated carboxylic acid monomer, and the content of the aromatic vinyl monomer does not exceed 52.5% by weight.

3. The adhesive composition according to claim 1, wherein the content of the conjugated diene monomer in the copolymer is form 45 to 75% by weight.

4. The adhesive composition according to claim 1, wherein the content of the cyanated vinyl monomer is from 1.5 to 20% by weight.

5. The adhesive composition according to claim 1, wherein the content of the vinylpyridine is from 10 to 30% by weight.

6. The adhesive composition according to claim 1, wherein an amount of the resorcin-formalin resin in terms of a solid content is 8 to 30 parts by weight per 100 parts by weight of the copolymer latex in terms of a solid content.

7. The adhesive composition according to claim 1 wherein the cyanated vinyl monomer is selected from the group consisting of acrylonitrile, methacrylonitrile, fumaronitrile and maleonitrile.

8. The adhesive composition according to claim 7 wherein the cyanated vinyl monomer is selected from the group consisting of acrylonitrile and methacrylonitrile.

* * * * *